Nov. 16, 1965 R. B. TYLER 3,218,189
STYRENE—BUTADIENE/VINYL ACETATE-CONTAINING POLYMER
PRIMER COMPOSITIONS FOR COATING POLYETHYLENE
SUBSTRATES AND THE COATED PRODUCTS
Filed May 17, 1962
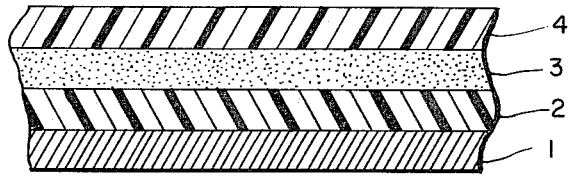

United States Patent Office 3,218,189
Patented Nov. 16, 1965

3,218,189
STYRENE-BUTADIENE/VINYL ACETATE-CONTAINING POLYMER PRIMER COMPOSITIONS FOR COATING POLYETHYLENE SUBSTRATES AND THE COATED PRODUCTS
Richard B. Tyler, Roxbury, Mass., assignor to W. R. Grace & Co., Cambridge, Mass., a corporation of Connecticut
Filed May 17, 1962, Ser. No. 195,557
12 Claims. (Cl. 117—47)

This invention relates to coated polyethylene. In a particular aspect, it relates to a composition suitable for use as a primer for securing adhesion of polyvinylidene chloride films to polyethylene substrates, and the resulting coated product.

Polyethylene has found wide commercial acceptance because of its good chemical resistance, lack of odor and toxicity, electrical properties and light weight. Films made from polyethylene are in wide use because of its low water-vapor permeability. One the other hand, polyethylene has a high permeability to organic vapors and to oxygen and other gases, and this factor has precluded its use in a number of applications where resistance to such permeation is required. For example, the diffusion of oxygen into a sealed polyethylene package containing oil and/or fat-bearing foods causes rancidity and other undesirable chemical changes. Also, when packaged foods are stored near odoriferous products, such as soap, the soap vapors diffuse into the package and impair the flavor and taste of the food.

It has been proposed to render polyethylene films impervious to organic vapors and oxygen by coating such films with vinylidene chloride resins. These films are non-toxic, odorless and have an inherent impermeability to oxygen unmatched by any other known commercial plastic materials. Such films, however, have not proved completely advantageous because known adhesives for polyethylene and films derived from emulsions of vinylidene chloride resins are not entirely satisfactory. As a consequence, the resin peels badly or the resin and film separate completely.

It is, therefore, an object of this invention to provide polyethylene substrates coated with polyvinylidene chloride films derived from an aqueous emulsion of resin solids. Upon evaporation of the water, the resin solids are fused to a thin continuous film which is permanently adhered to the substrate. The substrates may consist of polyethylene film composited with a paper product.

This objective is achieved by providing a primer composition by which the polyvinylidene chloride and polyethylene are strongly and permanently bonded together. As a result, the polyvinylidene chloride incorporates in the polyethylene the attribute of improved impermeability without impairing the clarity and/or flexibility of the polyethylene film. The coated substrates exhibit a high degree of impermeability not only to moisture but to organic vapors and oxygen as well.

A cross-section of the coated polyethylene product is shown in the single figure of the drawing in which the numeral 1 represents a base, such as kraft paper, 2 represents a polyethylene sheet having a modified surface, 3 represents the dried primer composition, and 4 is the film of polyvinylidene chloride derived from an emulsion.

The primer composition is comprised of (1) a major portion of a butadiene-styrene copolymer latex emulsion and (2) a minor portion of a latex emulsion comprised of 30 to 50 parts by weight of vinyl acetate copolymerized with 70 to 50 parts by weight of (a) a dialkyl ester of an alpha, beta-unsaturated dicarboxylic acid, or (b) a monoalkyl ester of an alpha beta-unsaturated monocarboxylic acid, or (c) mixtures of components (a) and (b). The primer seals the pores of the polyethylene film and primes it with a surface of a comparatively uniform coating that promotes adhesion with the polyvinylidene chloride. An impenetrable finish is thus provided to the film so that containers, such as cartons or bags, prepared from the coated film are endowed with an effective barrier against the transmission of air and vapors therethrough.

The butadiene-styrene latex reduces the tackiness of the primer composition to a workable state and is comprised of 20 to 80 percent butadiene and 80 to 20 percent styrene. A variety of such latices are commercially available as aqueous dispersions containing 30 to 60 percent resin solids in which the particle size averages about 0.025 millimicron. They are prepared by well-known techniques of emulsion polymerization. Any of the available latices having the stated butadiene-styrene ratios are operable in the primer compositions of this invention.

The vinyl acetate-containing polymer emulsion is extremely tacky in the wet state and when compounded with the butadiene-styrene latex, the resulting primer composition dries to a permanent tacky film. Monomers which may be copolymerized with vinyl acetate include 70 to 50 parts by weight of any of the following esters:

(a) Dialkyl esters, having 4 to 12 carbon atoms in each alkyl chain, of an alpha, beta-unsaturated dicarboxylic acid having 3 to 6 carbon atoms. Representative compounds of this group include n-butyl, sec-butyl, isobutyl, 2-methylhexyl, n-hexyl, n-octyl, isooctyl, 1-methylheptyl and 2-ethylhexyl esters of itaconic, citraconic, maleic and fumaric acids.

(b) Monoalkyl esters, having 8 to 12 carbon atoms in the alkyl chain, of an alpha, beta-unsaturated monocarboxylic acid having 3 to 6 carbon atoms. Illustrative compounds of this group include n-octyl, isooctyl, 1-methylheptyl and 2-ethylhexyl esters of acrylic, methacrylic and crotonic acids.

(c) Mixtures of the esters of groups (a) and (b).

The vinyl acetate-containing polymers are prepared by emulsion polymerization. A representative number of operable combinations of such polymers are illustrated in the following Examples 1 to 11.

| Example No. | Components of polymer (parts by weight) | | | | |
|---|---|---|---|---|---|
| | Vinyl acetate | Diisooctyl maleate | 2-ethylhexyl acrylate | Di(2-ethylhexyl) maleate | Dibutyl maleate |
| 1 | 33⅓ | 33⅓ | 33⅓ | | |
| 2 | 40 | 35 | 25 | | |
| 3 | 40 | 30 | 30 | | |
| 4 | 40 | 40 | 20 | | |
| 5 | 50 | | 50 | | |
| 6 | 50 | 50 | | | |
| 7 | 40 | | 60 | | |
| 8 | 40 | 60 | | | |
| 9 | 40 | | | 60 | |
| 10 | 40 | | 20 | | 40 |
| 11 | 40 | | 20 | 40 | |

Particularly effective vinyl acetate-containing polymers are the terpolymers of Examples 4, 10 and 11. Table I gives typical properties for the emulsion of the terpolymer of Example 4 which was comprised of 40 parts vinyl acetate, 40 parts diisooctyl maleate and 20 parts 2-ethylhexyl acrylate.

TABLE I

| | |
|---|---|
| Total solids, present by weight | 54–56. |
| Viscosity, cps. (25° C., Brookfield, No. 4 spindle, 60 r.p.m.) | 3000–5000. |
| Free monomer content | Less than one percent. |
| Color | White. |
| Odor | Slight, characteristic. |
| Particle size, microns | 0.5–1.5 (average 1.0). |
| Particle charge | Anionic. |
| pH | 4.5–5.5. |

The tackiness of the terpolymer of Example 4 coupled with its high cohesive bond strength makes it an effective component of the primer compositions of this invention.

The primer composition is generally formulated as an aqueous dispersion containing 5 to 20 percent by weight solids, preferably 10 percent solids content. The formulation is such as to give 70 to 98 percent butadiene-styrene solids and 30 to 2 percent solids of the vinyl acetate-containing polymer in the dried primer film. At a solids level of 2 percent or less of the vinyl acetate polymer in the dried film, the adhesive properties of the composition are too erratic and at a solids level of this polymer in excess of 30 percent, the composition is too tacky for proper application. The preferred range of solids content in the dried primer film is between about 95 to 80 percent by weight of butadiene-styrene copolymer and 5 to 20 percent of the vinyl acetate-containing polymer.

The manner in which the primer composition is prepared or the order in which the constituents are mixed with each other is not significant. The important criterion is that mixing be thorough to form a uniform dispersion. For example, all constituents may be charged to the mixer in toto, or they may be added incrementally without any set order of addition. However, care must be exercised to prevent metallic contamination. Materials which should be especially avoided are iron, mild steel, zinc, aluminum, copper, and to a lesser extent, brass or bronze. Contact with type 316 stainless steel, chromium, Teflon, polyethylene, glass and certain resin coatings (e.g., epoxy resin varnishes) produces no adverse effects. Mixing may be carried out at room temperature and atmospheric pressure.

When thoroughly mixed, the resulting primer composition is generally a white, milky dispersion having a pH of about 4 to 7 and a viscosity ranging between about 100 to 200 centipoises at 25° C. (Brookfield viscometer No. 1 spindle at 30 r.p.m.). With a composition yielding a film having a solids content of about 95 percent butadiene-styrene and 5 percent of the vinyl acetate-containing polymer, the viscosity is about 125 centipoises. Examples 12 to 16 illustrate representative primer compositions. The reported solids content is based on the weight in the dried primer film which was derived from an aqueous dispersion containing a total of 10 percent solids.

| | Percent of total solids in dried primer film | |
|---|---|---|
| Example No. | 60% styrene–40% butadiene copolymer | 40% vinyl acetate–40% diisooctyl maleate–20% 2-ethylhexyl acrylate terpolymer |
| 12 | 98 | 2 |
| 13 | 95 | 5 |
| 14 | 90 | 10 |
| 15 | 80 | 20 |
| 16 | 70 | 30 |

The polyvinylidene chloride which is used for coating the primed polyethylene substrate is applied as a latex. These colloidal dispersions contain about 50 percent to 70 percent solids, the average particle size of which ranges between about 1800 to 2400 A. as determined by electron microscopy. The viscosity is in the range of 20 to 40 centipoises at 25° C. (Brookfield No. 1 spindle, 60 r.p.m.) at 60 percent solids by weight.

The latex is a polymer composed of at least 70 percent by weight of vinylidene chloride copolymerized with other polymerizable monomers to supplement the inherent properties of the vinylidene chloride. Monomers that can be copolymerized with vinylidene chloride to improve the flexibility of the resin are vinyl esters, alkyl vinyl ethers, acrylate and methacrylate esters. Such monomers are usually used in the amounts of 5 to 30 percent by weight of the total resin. Additional monomers than can be used to improve other properties, such as latex film consolidation, adhesiveness and toughness, are acrylic acid, itaconic acid, aconitic acid, acrylonitrile and methacrylonitrile. These monomers are usually used in amounts ranging between about 1 to 10 percent by weight of the total resin. As used herein, the term "polyvinylidene chloride" is intended to cover polymers composed of a predominant amount, i.e., of the order of 70 to 95 percent of vinylidene chloride monomer copolymerized with 5 to 30 percent of other polymerizable monomers.

The polyvinylidene chloride latices which are used to provide high barrier characteristics to the polyethylene substrate are capable of forming clear, continuous films at room temperature without the aid of a plasticizing additive. They are odor-free emulsion polymers having a high vinylidene chloride content and a high total solids, and are internally plasticized by copolymerization. The exceptionally high barrier characteristics are due to the high vinylidene chloride content. Typical properties of a suitable latex are set out in Example 17.

*Example 17*

| | |
|---|---|
| Total solids | 60–62%. |
| Viscosity at 25° C. | 25 cps. |
| pH | 4.5–5.0. |
| Color | White-cream. |
| Particle size | 0.25 m. (approx.). |
| Weight per gallon | 11.5 lbs. |
| Mechanical stability | Excellent. |
| Storage stability | Excellent. |
| Chemical stability | Unstable to divalent or trivalent ions. |

The operative polyethylene substrates include polyethylene films per se and polyethylene films composited with a paper product, such as kraft paper and boxboard. These composites are prepared by methods which are well known, such as extrusion of the film onto the paper. The thickness of the substrate varies over a wide range and its selection will be dictated by the end use to which the coated article will be put.

Polyethylene is normally a non-adherent material and in order to promote adhesion thereto its surface must be modified. Surface modification may be affected by subjecting the polyethylene film to a variety of influences, such as electrostatic discharge, contact with an oxidizing flame, exposure to ultra violet light, and subjecting the film to a matted roller to provide a matte finish. Accordingly, as used herein, "modified polyethylene" is intended to cover such films having their surfaces conditioned to enhance adhesion irrespective of the method employed.

The method or means of depositing a coating of the primer composition on the modified polyethylene substrate is not critical. Any type of coating mechanism or device which is capable of depositing a uniform amount in the desired thickness to the substrate may be employed. Special types which may be used include air knife coater, horizontal and vertical size presses, trailing blade, transfer roll, reverse roll, roller coater, gravure, bead coat, metering bar, spray coater and curtain coater. Deposition may be carried out in one or a number of applications and the amount deposited is such as to provide a film thickness ranging between about .002 to .06 mil (dry basis). Thicknesses greater than .06 mil do not provide improved adhesion and any amounts in excess of that are merely wasteful.

The primer-coated substrate is then dried either in air or a suitable drying apparatus. Air-drying can be accomplished in less than one minute while oven-drying can be effected within 4 to 10 seconds at 35 to 105° C. The dried primer film is odorless, clear flexible, and slightly tacky and exhibits no separation between it and the substrate. The degree of adhesion is measured by the pressure-sensitive tape test in which a strip of tape is applied with the fingers to the dried primed substrate and then rapidly pulled off. When subjected to this test, the primer remains intact, indicating excellent adhesive properties to the substrate.

The same methods and mechanisms employed to deposit the primer composition onto the substrate may be used to apply the polyvinylidene chloride latex to the primed substrate. And the same care must be exercised to avoid metallic contamination. When using stainless steel equipment, it is desirable to mask or line some of the equipment upon which dried films of the polymer may be deposited during the coating operation. Teflon film is suitable for this purpose as this material inhibits adhesion between it and dried vinylidene chloride polymer films.

Some coating methods may require an increase in the viscosity of the latex. In such case, the viscosity change may be brought about by the addition of suitable thickening agents, such as sodium alginate, karaya gum, hydroxyethyl cellulose and polyvinyl alcohol. The latter also serves as a latex stabilizing agent. Best results are obtained by adding a small amount of latex to the thickener solution, stirring until homogeneous, then adding additional latex with continuous agitation until the desired viscosity is obtained.

Coating thickness of the polyvinylidene chloride latex may vary and depends upon the end use to which the article is put. Coatings which give a dried film thickness ranging from .02 to 1 mil have been found satisfactory for a myriad of uses. The desired thickness may be effected in one or more passes. To obtain film thicknesses exceeding about .45 mil, greater care is required in drying the coating than with lighter applications in order to prevent skin formation on the top surface of the film which will result in a cracked film. Coatings may be applied at speeds up to 2000 feet per minute of substrate.

Although film formation of the polyvinylidene chloride latex will take place by drying for about 2½ minutes at room temperature, true coalescence requires somewhat higher temperatures. Excellent films are obtained by drying at about 105° C. for about 10 seconds. It has been discovered that although a somewhat more flexible film may be obtained by a lower temperature cycle, the physical properties of the lower temperature film will gradually undergo a change over a period of about 2 to 3 weeks until the properties are comparable to those produced by the higher temperature drying cycle. Significant changes in physical characteristics of the films produced at the higher drying temperature have not been observed over a period of time extending beyond nine months. It has been found, however, that if excessive drying temperatures are employed, film discoloration may occur and, in some cases, blistering of the coating has been observed.

Example 18 illustrates one method for coating polyethylene substrates:

*Example 18*

A substrate was provided which comprised a base of kraft paper, having a ream weight of 40 pounds, laminated with a .5 mil thick sheet of polyethylene. The unlaminated surface of the polyethylene was modified by electrostatic treatment. 0.9 pound per ream of the primer composition of Example 13, diluted with water to a total solids content of 10 percent, was applied by the air knife method to the modified polyethylene surface at a speed of 350 feet per minute. The primed substrate was then dried at 121° C. for 4 seconds. The dried primer coat was .03 mil thick. 10 pounds per ream of polyvinylidene chloride latex containing a total solids of 56 percent was applied with an air knife coated onto the dried primed substrate at a rate of 400 feet per minute. The coated substrate was then dried at 140° C. for 10 seconds. The dried polyvinylidene chloride film measured .4 mil thick.

As used herein, a ream is composed of 500 sheets, each sheet measuring 2 feet by 3 feet or, in the alternative, 3000 feet$^2$ ream.

The properties of uncoated high density polyethylene as compared with coated substrates are reflected in the following Table II. The thickness of the primer composition used in the polyethylene-polyvinylidene chloride films was about .05 mil, dry basis. The final thicknesses of the polyvinylidene chloride films were obtained in three applications of latex, each application being deposited upon the other with a short drying step interposed between successive applications.

*Table II*

| Film | Water vapor transmission rate (g./100 in $^2$/ 24 hrs. at 100° F. and 90% R.H.) | Oxygen transmission rate (cc./mm./cm.$^2$/ sec./cm. Hg×10$^{-10}$ at 25° C.) |
| --- | --- | --- |
| High density polyethylene, 1 mil thick | 0.81 | 55.0 |
| ½ mil thick polyethylene coated with ½ mil thick polyvinylidene chloride film | 0.268 | 0.29 |
| ¼ mil thick polyethylene coated with ¾ mil thick polyvinylidene chloride film | 0.14 | 0.064 |

It is noted that the coated substrates give appreciable reductions in water vapor and oxygen transmission rates. As the amount of polyvinylidene chloride is increased, there is a corresponding increase in water and gas impermeability. The adhesive properties of the primer compositions were such that the components of the coated film were inseparable.

Films produced upon drying the vinylidene chloride polymer latex disposed on primed polyethylene substrates are characterized by a high gloss, toughness, excellent mar resistance, moderate scorability, moderate foldability, some fire-retardant properties, excellent clarity, good blocking resistance, high electrical resistivity and extremely high gas impermeability.

I claim:

1. A composition for priming polyethylene surfaces which consists of a butadiene-styrene polymer latex comprised of 20 to 80 percent butadiene and 80 to 20 percent styrene and a vinyl acetate-containing polymer emulsion comprised of 30 to 50 percent of vinyl acetate copolymerized with 70 to 50 percent of a member selected from the group consisting of
   (a) a dialkyl ester having 4 to 12 carbon atoms in each alkyl chain of an alpha, beta-unsaturated dicarboxylic acid having 3 to 6 carbon atoms;
   (b) a monoalkyl ester having 8 to 12 carbon atoms in the alkyl chain of an alpha, beta-unsaturated monocarboxylic acid having 3 to 6 carbon atoms; and
   (c) mixtures of esters (a) and (b),
said butadiene-styrene latex comprising 70 to 98 percent and said vinyl acetate-containing polymer comprising 30 to 2 percent of said composition based on a dry weight.

2. A composition according to claim 1 wherein the butadiene-styrene polymer is comprised of 40 percent butadiene and 60 percent styrene.

3. A composition according to claim 1 wherein the vinyl acetate-containing polymer is comprised of 40 percent vinyl acetate, 40 percent diisooctyl maleate, and 20 percent 2-ethylhexyl acrylate.

4. A composition according to claim 1 wherein the vinyl acetate-containing polymer is comprised of 40 percent vinyl acetate, 40 percent dibutyl maleate, and 20 percent 2-ethylhexyl acrylate.

5. A composition according to claim 1 wherein the vinyl acetate-containing polymer is comprised of 40 percent vinyl acetate, 40 percent di(2-ethylhexyl) maleate, and 20 percent 2-ethylhexyl acrylate.

6. A composition for priming polyethylene surfaces which consists of a 40 percent butadiene-60 percent styrene polymer latex and a vinyl acetate-containing polymer emulsion comprised of 40 percent vinyl acetate, 40 percent diisooctyl maleate, and 20 percent 2-ethylhexyl acrylate, said butadiene-styrene polymer comprising 95 percent and said vinyl acetate-containing polymer comprising 5 percent of said composition based on a dry weight.

7. A film substantially impervious to water vapor, organic vapors and gases comprising a polyethylene substrate having a modified surface, the primer composition of claim 1 deposited and dried on said modified surface, and a film of a vinylidene chloride polymer disposed on and bonded to the primer composition.

8. A film substantially impervious to water vapor, organic vapors and gases comprising a polyethylene substrate having a modified surface, the primer composition of claim 2 deposited and dried on said modified surface, and a film of a vinylidene chloride polymer disposed on and bonded to the primer compoistion.

9. A film substantially impervious to water vapor, organic vapors and gases comprising a polyethylene substrate having a modified surface, the primer composition of claim 3 deposited and dried on said modified surface, and a film of a vinylidene chloride polymer disposed on and bonded to the primer composition.

10. A film substantially impervious to water vapor, organic vapors and gases comprising a polyethylene substrate having a modified surface, the primer composition of claim 4 deposited and dried on said modified surface, and a film of a vinylidene chloride polymer disposed on and bonded to the primer composition.

11. A film substantially impervious to water vapor, organic vapors and gases comprising a polyethylene substrate having a modified surface, the primer composition of claim 5 deposited and dried on said modified surface, and a film of a vinylidene chloride polymer disposed on and bonded to the primer composition.

12. A film substantially impervious to water vapor, organic vapors and gases comprising a polyethylene substrate having a modified surface, the primer composition of claim 6 deposited and dried on said modified surface, and a film of a vinylidene chloride polymer disposed on and bonded to the primer composition.

References Cited by the Examiner
UNITED STATES PATENTS

| | | | |
|---|---|---|---|
| 2,824,025 | 2/1958 | McIntyre | 117—161 |
| 3,018,189 | 1/1962 | Traver | 117—138.8 |
| 3,075,857 | 1/1963 | Fior et al. | 117—138.8 |
| 3,079,278 | 2/1963 | Naudain | 117—138.8 |
| 3,101,292 | 8/1963 | Kine et al. | 117—140 |
| 3,128,200 | 4/1964 | Park et al. | 117—72 |
| 3,138,431 | 6/1964 | Swiggett | 117—143 X |

RICHARD D. NEVIUS, *Primary Examiner.*

WILLIAM D. MARTIN, *Examiner.*